United States Patent
Punathil (10) Patent No.: US 11,734,129 B2
(45) Date of Patent: Aug. 22, 2023

(54) LOOP EDGE SNAPSHOTTING

(71) Applicant: INTERNATIONAL BUSINESS MACHINES CORPORATION, Armonk, NY (US)

(72) Inventor: Gireesh Punathil, Kannur (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 109 days.

(21) Appl. No.: 17/538,239

(22) Filed: Nov. 30, 2021

(65) Prior Publication Data
US 2023/0168975 A1 Jun. 1, 2023

(51) Int. Cl.
G06F 11/14 (2006.01)
G06F 11/07 (2006.01)
G06F 9/30 (2018.01)
G06F 9/54 (2006.01)

(52) U.S. Cl.
CPC ........ *G06F 11/1484* (2013.01); *G06F 9/3009* (2013.01); *G06F 9/542* (2013.01); *G06F 11/0757* (2013.01); *G06F 2201/84* (2013.01)

(58) Field of Classification Search
CPC ...... G06F 11/14; G06F 11/07; G06F 11/0757; G06F 9/542; G06F 9/3009; F06F 11/1484
See application file for complete search history.

(56) References Cited

U.S. PATENT DOCUMENTS

| 10,635,566 B1 | 4/2020 | Talluri et al. |
| 10,642,633 B1 | 5/2020 | Chopra et al. |
| 10,681,008 B1* | 6/2020 | Emelyanov ......... H04L 43/0811 |
| 11,216,343 B1* | 1/2022 | Emelyanov ......... G06F 11/1451 |
| 2018/0011789 A1* | 1/2018 | Dawson .............. G06F 12/0269 |
| 2018/0107600 A1* | 4/2018 | Dawson ................ G06F 13/366 |
| 2020/0218584 A1* | 7/2020 | Punathil .................. G06F 9/542 |

(Continued)

FOREIGN PATENT DOCUMENTS

IN 202147017093 4/2021

OTHER PUBLICATIONS

Mell et al., "The NIST Definition of Cloud Computing", NIST, Special Publication 800-145, Sep. 2011, 7 pages.

(Continued)

*Primary Examiner* — Kamini B Patel
(74) *Attorney, Agent, or Firm* — Monchai Chuaychoo; Andrew D. Wright; Calderon Safran & Cole P.C.

(57) ABSTRACT

A method includes accessing, by a computing device, an event machine of an application running on a user device; determining, by the computing device, an event polling stage of the event machine is occurring; measuring, by the computing device, an event polling stage time of the event polling stage; causing, by the computing device, a thread of the application to take a snapshot of the application in response to determining the event polling stage; measuring, by the computing device, a snapshot time for the snapshot of the application; determining, by the computing device, whether the snapshot time is less than or equal to the event polling stage time; causing, by the computing device, the thread of the application to take a new snapshot in response to determining a new event polling stage; and causing, by the computing device, an alternate thread of the application to take the new snapshot.

20 Claims, 7 Drawing Sheets

(56) References Cited

U.S. PATENT DOCUMENTS

| | | | |
|---|---|---|---|
| 2020/0356397 A1* | 11/2020 | Kumatagi | H04L 45/02 |
| 2021/0026947 A1* | 1/2021 | Korotaev | G06F 21/577 |
| 2021/0081370 A1* | 3/2021 | Ma | G06F 16/182 |
| 2021/0117377 A1 | 4/2021 | Savir et al. | |
| 2022/0311832 A1* | 9/2022 | Shukla | G06F 9/461 |

OTHER PUBLICATIONS

Anonymous, "V8 Shapsnot", https://wiki.qt.io/V8Snapshot, Apr. 18, 2015, 2 pages.

Anonymous, "CRIU, a project to implement checkpoint/restore functionality for Linux", http://www.criu.org/index.php?title=Main_Page&oldid=5189, Retrieved on Nov. 29, 2021, 3 pages.

Anonymous, "VMWARE Workstation 4, Using the Snapshot", https://www.vmware.com/support/ws4/doc/preserve_snapshot_ws.html, 2021, 4 pages.

Anonymous, "How to Use the Java Compiler Replay File to debug JVM Issues:", https://stackoverflow.com/questions/50820900/how-to-use-the-java-compiler-replay-file-to-debug-jvm-issues, Jun. 13, 2018, 2 pages.

* cited by examiner

LOOP EDGE SNAPSHOTTING

BACKGROUND

Aspects of the present invention relate generally to computing devices and, more particularly, to loop edge snapshotting.

Event machines manage event lifecycles of a running application. Event machines manage these event lifecycles by dispatching instructions in event loops.

SUMMARY

In a first aspect of the invention, there is a computer-implemented method including: accessing, by a computing device, an event machine of an application running on a user device; determining, by the computing device, an event polling stage of the event machine is occurring; measuring, by the computing device, an event polling stage time of the event polling stage; causing, by the computing device, a thread of the application to take a snapshot of the application in response to determining the event polling stage; measuring, by the computing device, a snapshot time for the snapshot of the application; determining, by the computing device, whether the snapshot time is less than or equal to the event polling stage time; in response to the snapshot time being less than or equal to the event polling stage time, causing, by the computing device, the thread of the application to take a new snapshot in response to determining a new event polling stage; and in response to the snapshot time being greater than the event polling stage time, causing, by the computing device, an alternate thread of the application to take the new snapshot.

In another aspect of the invention, there is a computer program product including one or more computer readable storage media having program instructions collectively stored on the one or more computer readable storage media. The program instructions are executable to: access an event machine of an application running on a user device; determine an event polling stage of the event machine is occurring; measure an event polling stage time of the event polling stage using a timer of the event machine; cause a thread of the application to take a snapshot of the application in response to determining the event polling stage; measure a snapshot time for the snapshot of the application using the timer of the event machine; determine whether the snapshot time is less than or equal to the event polling stage time; in response to the snapshot time being less than or equal to the event polling stage time, cause the thread of the application to take a new snapshot in response to determining a new event polling stage; and in response to the snapshot time being greater than the event polling stage time, cause an alternate thread of the application to take the new snapshot.

In another aspect of the invention, there is system including a processor, a computer readable memory, one or more computer readable storage media, and program instructions collectively stored on the one or more computer readable storage media. The program instructions are executable to: access an event machine of an application running on a user device; determine an event polling stage of the event machine is occurring; determine an event intercept stage of the event machine occurs; measure an event polling stage time of the event polling stage between the event polling stage and the event intercept stage using a timer of the event machine; cause a main thread of the application to take a snapshot of the application in response to determining the event polling stage; measure a snapshot time for the snapshot of the application using the timer of the event machine; determine whether the snapshot time is less than or equal to the event polling stage time; in response to the snapshot time being less than or equal to the event polling stage time, cause the main thread of the application to take a new snapshot in response to determining a new event polling stage; and in response to the snapshot time being greater than the event polling stage time, cause an alternate thread of the application to take the new snapshot.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Aspects of the present invention relate generally to computing devices and, more particularly, to loop edge snapshotting. According to aspects of the invention, systems and methods take snapshots of an application at loop edges of event loops in an event driven runtime. In this manner, implementations of the invention allow for a recording of a state of an application without disturbing the running processes.

Implementations of the invention allow for a practical application of taking snapshots of an application for later replication of the application. In embodiments, systems and methods take the snapshots at loop edges of event loops during a running of the application. By taking snapshots at the loop edges, systems and methods do not disturb as many of the processes of the total processes running in the application. In this way, systems and methods allow for a practical application of taking snapshots of an application without disturbing as many processes of the total processes running in that application.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
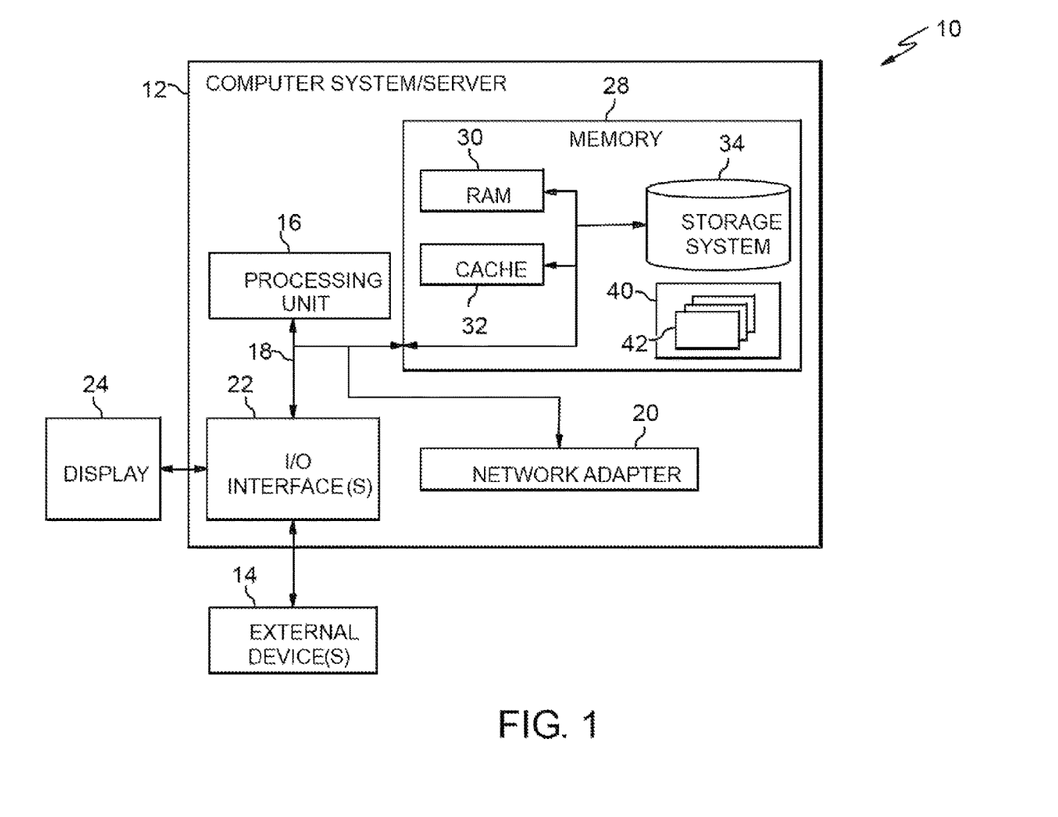
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
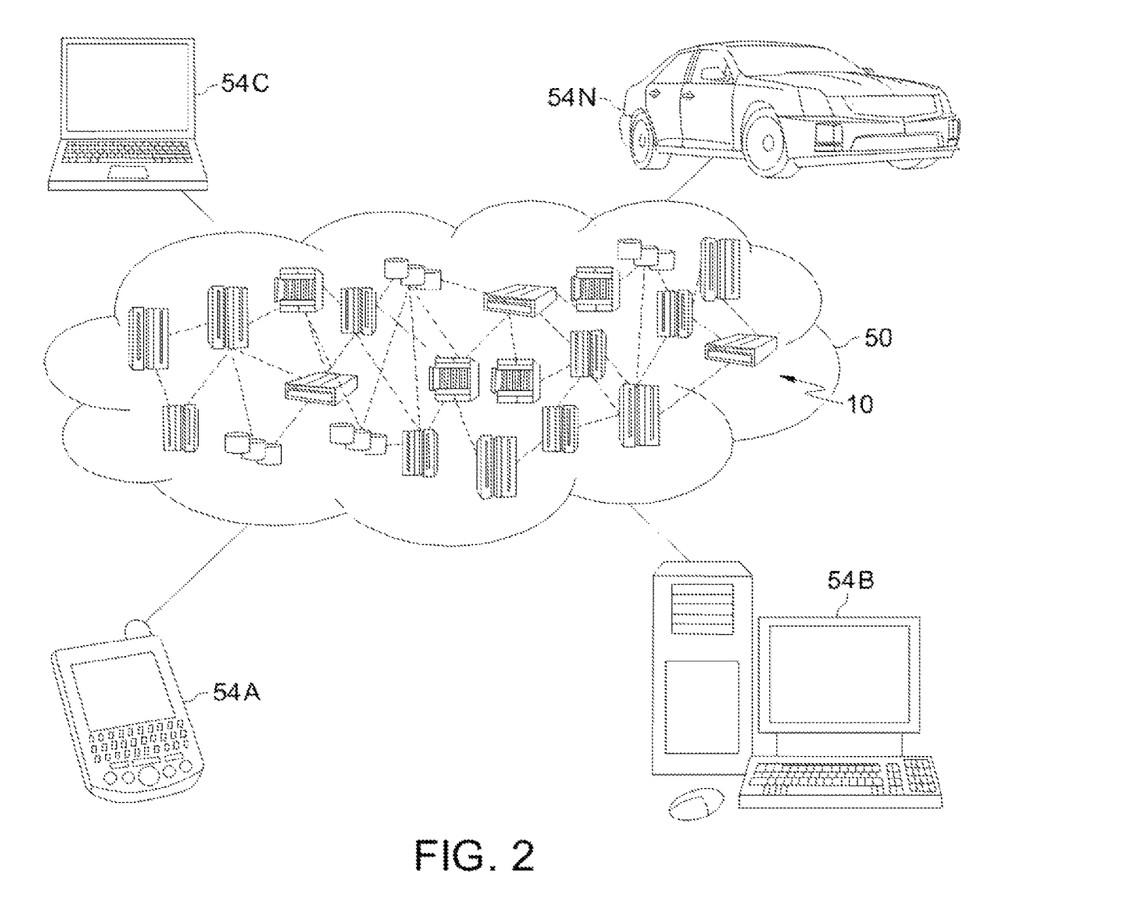
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
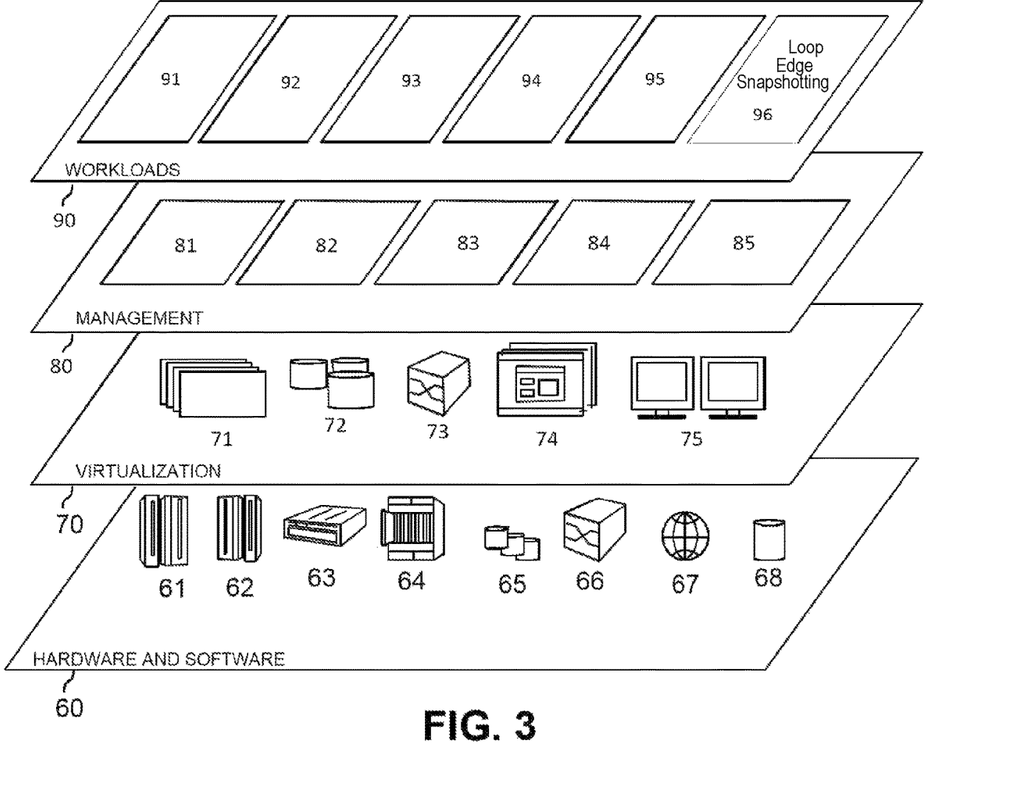
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and snapshotting 96.

Implementations of the invention may include a computer system/server 12 of FIG. 1 in which one or more of the program modules 42 are configured to perform (or cause the computer system/server 12 to perform) one of more functions of snapshotting 96 of FIG. 3. For example, the one or more of the program modules 42 may be configured to: a) access an event machine of an application running on a user device; b) determine an event polling stage of the event machine is occurring; c) measure an event polling stage time of the event polling stage; d) cause a thread of the application to take a snapshot of the application in response to determining the event polling stage; e) measure a snapshot time for the snapshot of the application; f) determine whether the snapshot time is less than or equal to the event polling stage time; g) in response to determining the snapshot time is less than or equal to the event polling stage time, cause the thread of the application to take a new snapshot in response to determining a new event polling stage; and h) in response to determining the snapshot time greater than the event polling stage time, cause an alternative thread of the application to take the new snapshot.

Figure 4:
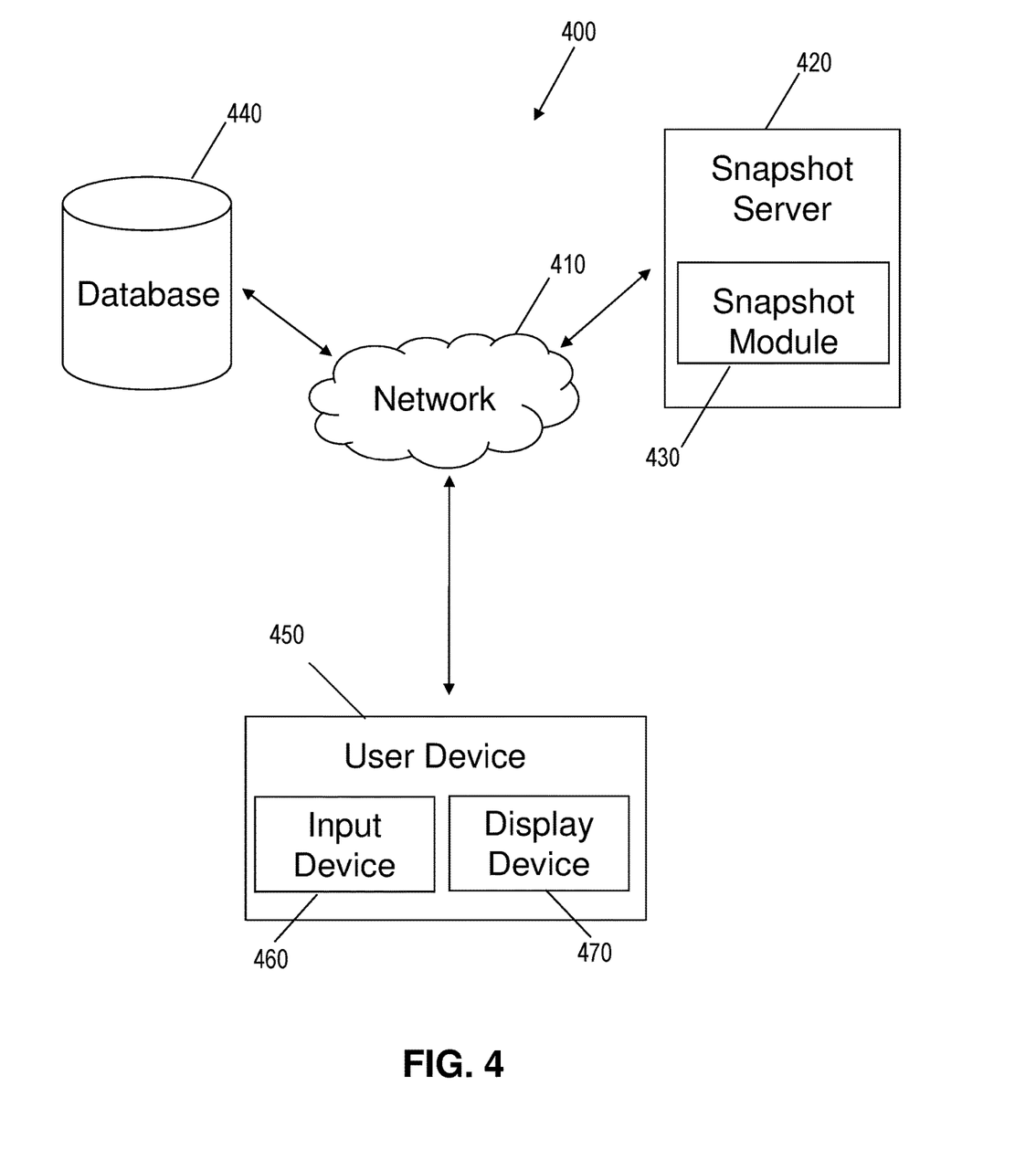
FIG. 4 shows a block diagram of an exemplary environment in accordance with aspects of the invention.

FIG. 4 shows a block diagram of an exemplary environment 400 in accordance with aspects of the invention. In embodiments, the environment 400 includes a network 410, a snapshot server 420, a database 440, and a user device 450 having an input device 460 and a display device 470.

In embodiments, the user device 450 includes one or more components of the computer system 12 of FIG. 1. In embodiments, the user device 450 may be a laptop computer, a desktop computer, a tablet computer, for example. In embodiments, the input device 460 includes a mouse, a keyboard, and a microphone, amongst other input device examples. In embodiments, the display device 470 is a screen which displays information to the user.

In embodiments, the snapshot server 420 is a computing device, such as the computer system/server 12 of FIG. 1. In embodiments, the snapshot server 420 includes a snapshot module 430, which comprises one or more program modules such as program modules 42 described with respect to FIG. 1. In embodiments, the snapshot server 420 includes additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

The network 410 comprises one or more computer networks, such as one or more of a LAN, WAN, and the Internet. In one embodiment, the network 410 is representative of a cloud computing environment, such as described in FIG. 2.

In embodiments, production anomalies of applications are relatively hard to debug. Examples of reasons why include a limited set of logs for the application, and files of the application being relatively complex. Accordingly, debugging these production anomalies is relatively slow. One approach to debug an application includes replaying a failing sequence of the application. However, to replay the application, there needs to be a snapshot of the application to duplicate the application, thereby allowing relatively more data examination points to be available during the debugging process.

In embodiments, a snapshot is a recording of a state of a virtual machine of an application which has an event driven architecture. In embodiments, the virtual machine is an event machine which accompanies a computer programming language of an application. Examples of an application with an event driven architecture include an electronic commerce (e-commerce) web-based application or a cloud-based application, amongst other examples. In these examples, the application includes a computer programming language which creates the e-commerce web-based application or cloud-based application. In embodiments, the computer programming language includes an event machine, i.e., virtual machine, which sends out instructions to an operating system of the user device 450 and/or a server hosting the application, amongst other examples. Examples of events include a user of the user device 450 clicking on a radio button in the application using the input device 460, a user entering data in the application, and the user closing a window in the application using the input device 460, amongst other examples. In this way, events are actions that occur when a user interacts with the application, and the user creates these events through inputs using the input device 460.

In embodiments, each application includes at least one thread which runs the processes of the application. In embodiments, a thread is a path taken for execution of instructions in a program. By default, web-based applications and cloud-based applications always have one thread running, which is the main thread. However, taking a snapshot of the application at a time when relatively many processes are occurring causes an unclear recording of a state of the application. Additionally, taking snapshots too frequently can affect an overall throughput of the application. Alternatively, taking snapshots too infrequently may increase a complexity of the state of the application, thereby reducing an ability to isolate an issue which is causing problems in the application. Accordingly, an issue arises as to when to take a snapshot of the application.

Figure 5A:
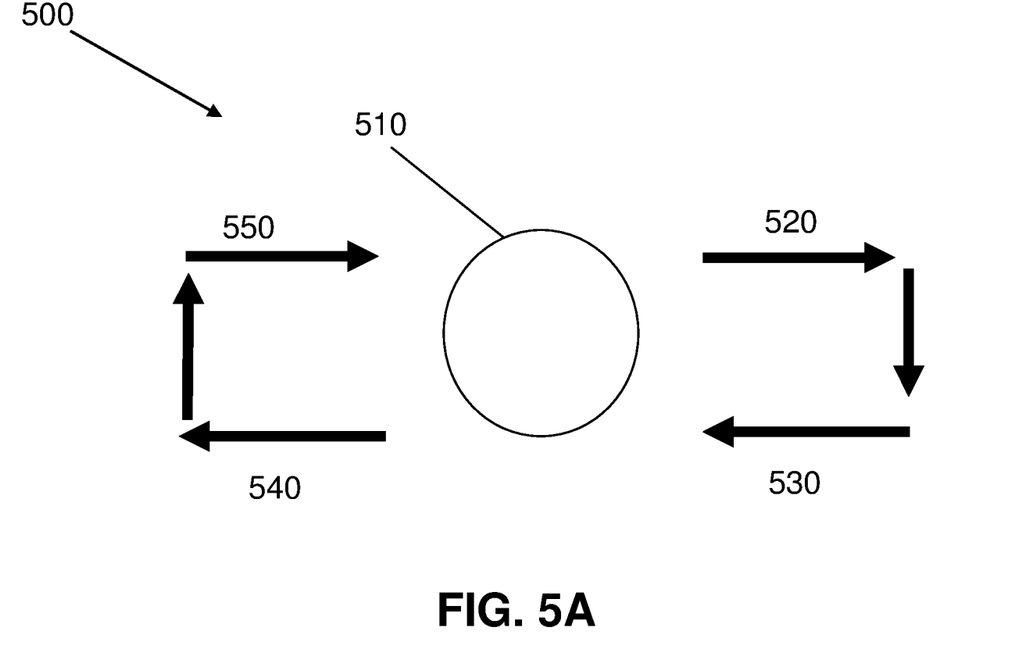
FIGS. 5A and 5B show event loops in accordance with aspects of the invention.
Figure 5B:
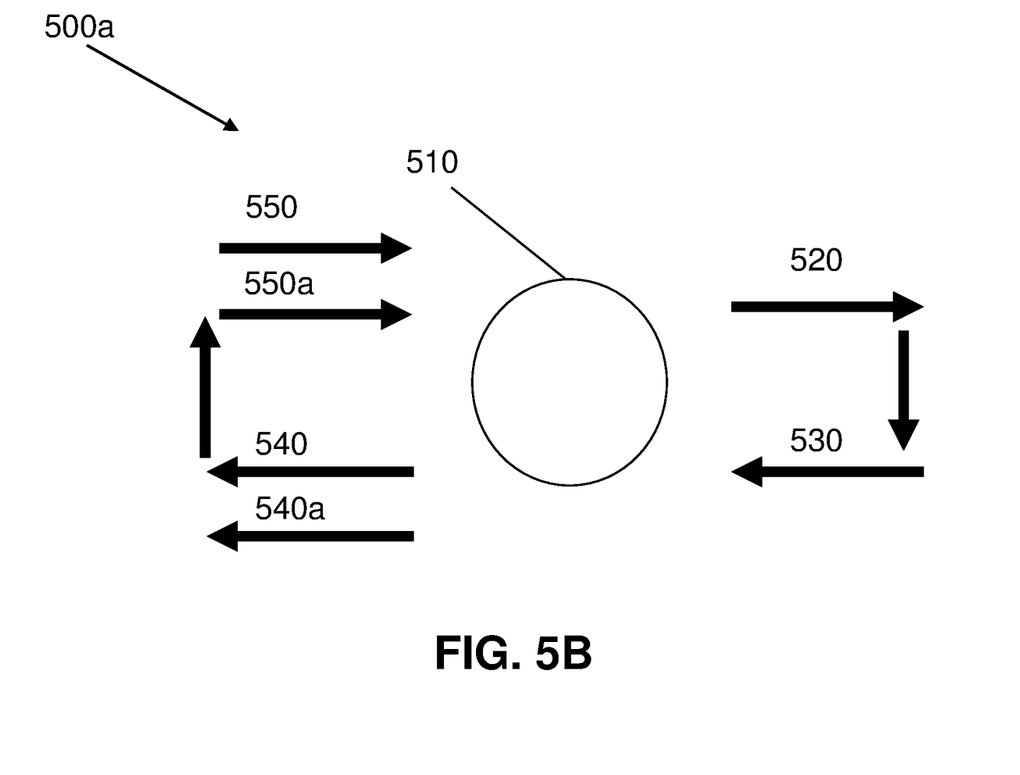

FIGS. 5A and 5B illustrate event loops 500, 500a of an event machine 510, in accordance with aspects of the invention. FIGS. 5A and 5B are described with reference to elements depicted in FIG. 4. In embodiments, FIG. 5A illustrates an event loop 500 for a single event, while FIG. 5B illustrates an event loop 500a for a plurality of events.

In embodiments, the event loops 500, 500a include several stages. In embodiments, a first stage of the event loops 500, 500a is an event polling stage 520 by the event machine 510. In embodiments, during the event polling stage 520, the event machine 510 polls an operating system of the user device 450 to determine whether there is an event occurrence.

In embodiments, in response to determining there is an event occurrence, the event machine 500 intercepts the event at the event intercept stage 530, as shown in FIG. 5A. In further embodiments, if there are multiple events occurring, the event machine 500 has multiple event intercept stages 530, 530a as shown in FIG. 5B. In embodiments, in response to intercepting the event, the event machine prepares instructions to the operating system of the user device 450.

Continuing with FIGS. 5A and 5B, the next stage in the event loops 500, 500a is the event handling stage 540. During the event handling stage 540, the event machine 500 sends out the instructions to the operating system of a user device 450. In further embodiments, if there are multiple events occurring, the event machine 500 has multiple event handling stages 540, 540a as shown in FIG. 5B. In response to receiving the instructions, the operating system allocates various threads from the processor of the user device 450 to carry out the instructions.

In embodiments, another stage of the event loops 500, 500a is an event registration stage 550. In embodiments, during event registration 510, the event machine 500 registers the event occurrence to a local memory of the user device 450. In further embodiments, if there are multiple events occurring, the event machine 500 has multiple event registration stages 550, 550a as shown in FIG. 5B.

In embodiments, the time between the event polling stage 520 and the event intercept stages 530, 530a is a relatively optimal time for a snapshot of the application because the application is relatively idle. Specifically, during the event polling stage 520, there is a relatively lower amount of processes running out of the total processes running because instructions to respond to the event have yet to be sent. By having a relatively lower amount of processes running, the snapshot is relatively clearer in comparison to a snapshot where all of the total processes running. Accordingly, by having a relatively clearer snapshot, the data examination points in the snapshot are relatively more visible, which improves a debugging process of the application if problems arise during the running of the application. In embodiments, the time between the event polling stage 520 and the event intercept stages 530, 530*a* are referred to as loop edges.

Figure 6:
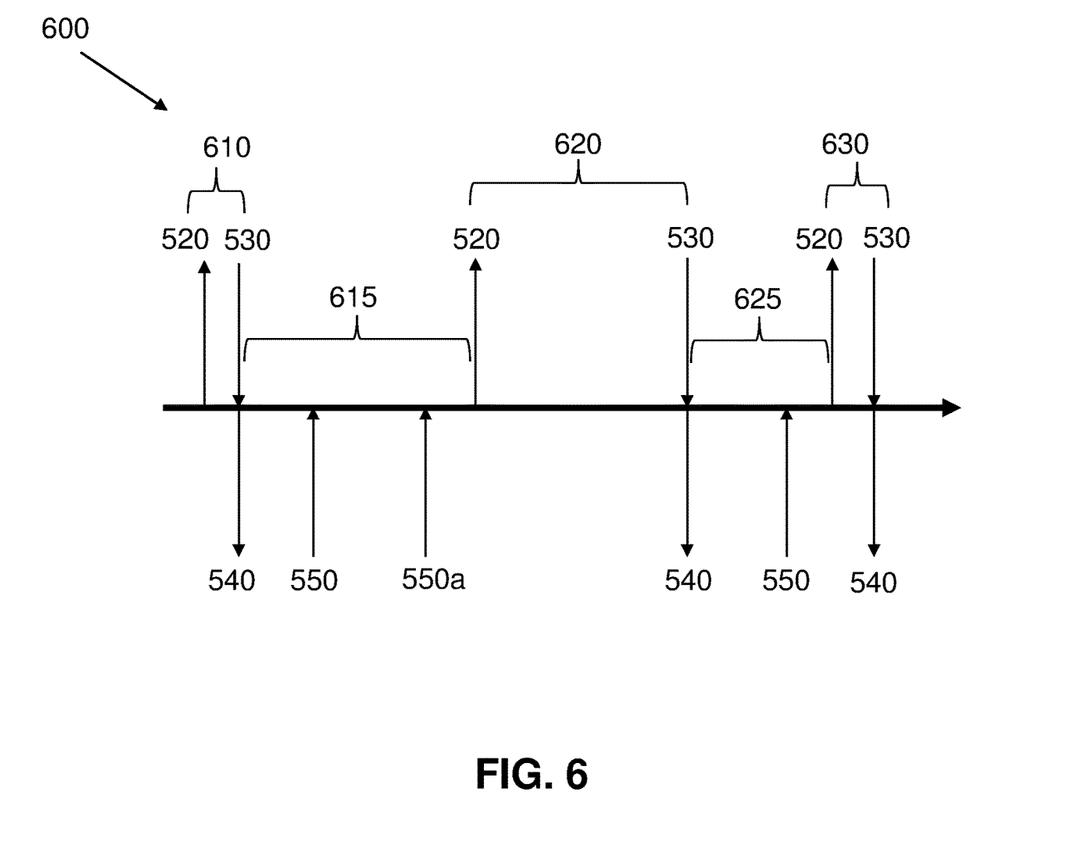
FIG. 6 shows snapshotting in accordance with aspects of the invention.

FIG. 6 illustrates snapshots 610, 620, 630 of the application, in accordance with aspects of the invention. FIG. 6 is described with reference to elements depicted in FIGS. 4, 5A, and 5B. In embodiments, FIG. 6 illustrates a time graph 600 for taking snapshots 610, 620, 630 of the application over time.

In embodiments, in view of training, the snapshot module 430 takes the snapshots 610, 620, 630 during an event polling stage of the event polling stages 520, 520*a* of the event loops 600, 600*a*. In embodiments, the training of the snapshot module begins with the user device 450 taking a snapshot of the snapshots 610, 620, 630 of the application. In embodiments, the user device 450 takes a snapshot during an event polling stage of the event polling stages 520, 520*a*, before the user device 450 creates an event of the events 615, 625. Since a relatively lower amount of processes out of the total processes are running prior to an event of the events 615, 625 occurring, an event polling stage of the event polling stages 520, 520*a* is an optimal time for the user device 450 to take the snapshot. In embodiments, the user device 450 sends the snapshots 610, 620, 630 to the snapshot module 430 through the network 410 for training.

In embodiments, the snapshot module 430 uses machine learning to learn which portions of code correspond to the event polling stages 520, 520*a*. Specifically, as the snapshot module 430 receives the snapshots 610, 620, 630 from the user device 450, the snapshot module 430 compiles the snapshot data as training data and saves this training data in the database 440 as a knowledge corpus. In embodiments, the training data includes an event polling code which corresponds to the event polling stages 520, 520*a*. In this way, the snapshot module 430 determines when an event polling stage of the event polling stages 520, 520*a* is occurring by comparing the event polling code to code that is currently running in the event machine 510. In further embodiments, the training data includes portions of codes which correspond to other stages of the event loops, e.g., event intercept stages 530, 530*a*. As an example, the snapshot module 430 determines that an event intercept stage of the event intercept stages 530, 530*a* occurs includes comparing code from the event machine to event intercept stage code in the knowledge corpus.

In embodiments, in response to the training, the snapshot module 430 accesses the event machine 510 of the application. In embodiments, to access the event machine 500, the snapshot module 430 receives permission from the user device 450. In embodiments, the snapshot module 430 receives the permission from user device 450 through the network 410.

In embodiments, in response to the snapshot module 430 receiving permission to access the event machine 510, the snapshot module 430 determines when an event polling stage of the event polling stages 520, 520*a* occurs. In embodiments, snapshot module 430 determines that an event polling stage of the event polling stages 520, 520*a* is occurring by using the knowledge corpus to recognize the code which corresponds to the event polling stage of the event polling stages 520, 520*a*. Specifically, the snapshot module 430 determines an event polling stage of the event machine 510 is occurring by comparing code currently running in the event machine 510 to event polling stage code from the database 440.

In embodiments, in response to determining that an event polling stage of the event polling stages 520, 520*a* is occurring, the snapshot module 430 measures an event polling stage time for the event polling stage of the event polling stages 520, 520*a*. In embodiments, the snapshot module 430 determines when an event polling stage ends of the event polling stages 520, 520*a* and when an event intercept stage of the event intercept stages 530, 530*a* occurs. In this way, a measuring of the event polling stage time of the event polling stage includes the snapshot module 430 measuring a time between a start of the event polling stage and a start of the event intercept stage.

In embodiments, the snapshot module 430 measures the event polling stage time by taking a time measurement using a timer of the event machine 510. As an example, an event polling stage time measurement is 1 second for the event machine 510 to poll the operating system of the user device 450 to determine whether there is an event occurrence, amongst other time examples.

In embodiments, as the application continues to run, the snapshot module 430 measures several event polling stage times of the event polling stages 520, 520*a*. In even further embodiments, the snapshot module 430 determines an average time for the event polling stage using the event polling stage time measurements. In embodiments, the snapshot module 430 saves the event polling stage time measurements for the event polling stages 520, 520*a* in the knowledge corpus in the database 440.

In embodiments, in response to determining that an event polling stage of the event polling stages 520, 520*a* is occurring, the snapshot module 430 causes the main thread of the application to take a snapshot of the snapshots 610, 620, 630. In embodiments, the snapshot module 430 causes the main thread of the application to take the snapshot by sending an instruction to the event machine 510. In this way, the snapshot module 430 uses the event machine 510 to take the snapshot of the snapshots 610, 620, 630. In embodiments, the snapshot module 430 stores the snapshot in the database 440.

In embodiments, during the taking of the snapshot of the snapshots 610, 620, 630, the snapshot module 430 measures a snapshot time for the snapshot of the application. In embodiments, the snapshot module 430 measures the snapshot time using a timer of the event machine 510. In embodiments, the snapshot module 430 stores the snapshot time in the database 440.

In embodiments, in response to measuring the snapshot time, the snapshot module 430 compares the snapshot time to the event polling stage time. Specifically, the snapshot module 430 determines whether the snapshot time is less than or equal to the event polling stage time. As an example, the snapshot time is 1 second, while the event polling stage time is 2 seconds. In this example, the snapshot time is less than or equal to the event polling stage time. Alternatively, as another example, the snapshot time is 2 seconds, while the event polling stage time is 1 second. In this example, the snapshot time is greater than the event polling stage time.

In embodiments, in response to determining that the snapshot time is less than or equal to the event polling stage time, the snapshot module 430 causes a thread of the application to take a new snapshot in response to determining a new event polling stage. In embodiments, the thread of the application is the main thread, i.e., the thread that is always running.

In alternative embodiments, in response to determining that the snapshot time is greater than the event polling stage time, the snapshot module 430 causes an alternate thread of the application to take a new snapshot in response to determining a new event polling stage. In embodiments, the alternate thread is a thread that is not always running. In embodiments, regardless of whether the main thread takes the snapshot or not, the snapshot module discards a previous snapshot and saves the snapshot in the database 440. In this way, if the application experiences an issue, this snapshot is usable to replay the last sequences to diagnose the issue. In further embodiments, the snapshot module 430 is configurable to identify a relatively stable snapshot, i.e., relatively less processes running, and then not need to cause a snapshot every time an event polling stage of the event polling stages 520, 520*a*.

Figure 7:
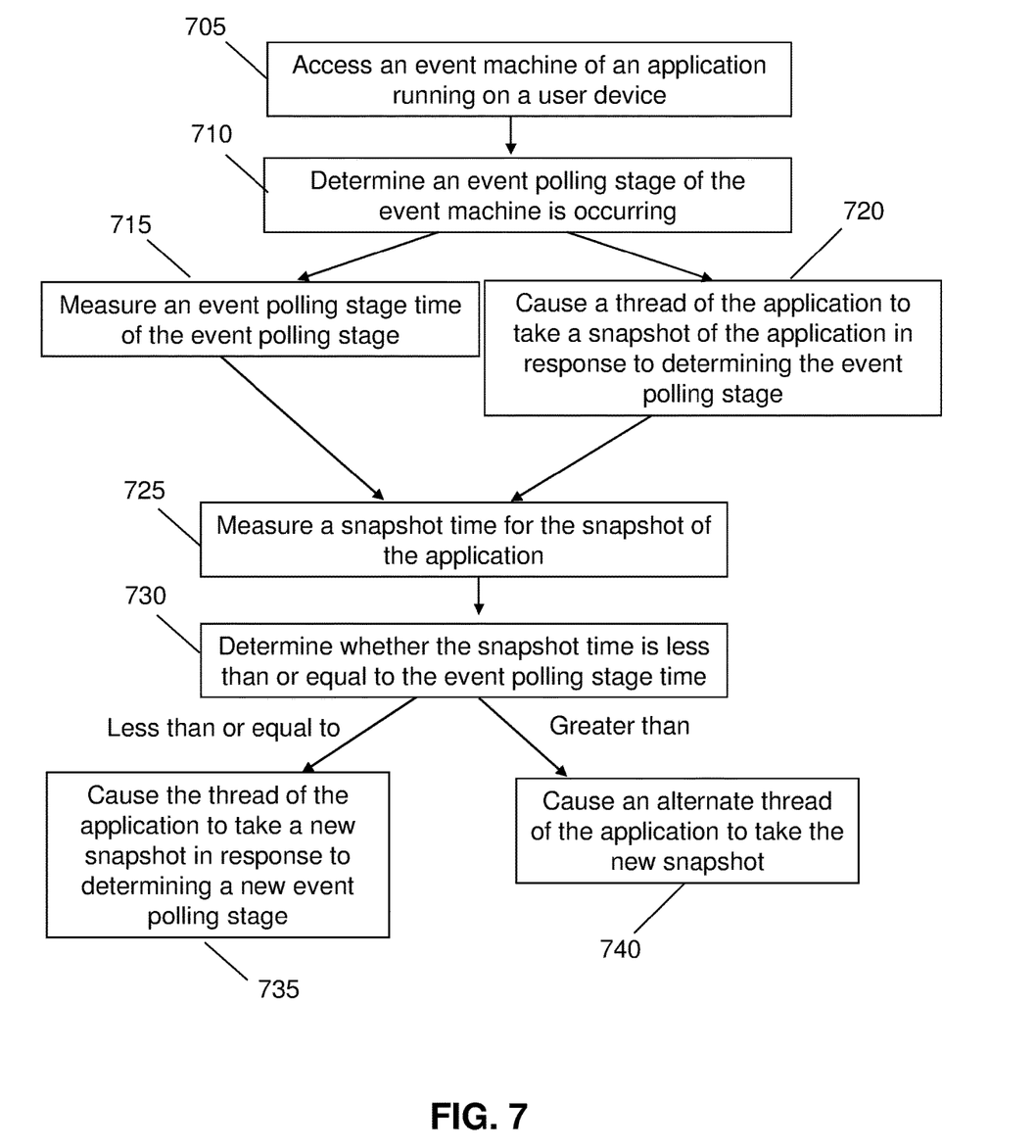
FIG. 7 shows a flowchart of an exemplary method in accordance with aspects of the invention.

FIG. 7 shows a flowchart of an exemplary method in accordance with aspects of the present invention. Steps of the method may be carried out in the environment of FIG. 4 and are described with reference to elements depicted in FIGS. 4, 5A, 5B, and 6.

At step 705, the system accesses an event machine of an application running on a user device. In embodiments, and as described with respect to FIGS. 4, 5A, 5B, and 6, the snapshot module 430 accesses the event machine 510 in response to receiving permission from the user device 450.

At step 710, the system determines an event polling stage of the event machine is occurring. In embodiments, and as described with respect to FIGS. 4, 5A, 5B, and 6, the snapshot module 430 determines an event polling stage of the event machine 510 is occurring by comparing code currently running in the event machine 510 to event polling stage code from the database 440.

At step 715, the system measures an event polling stage time of the event polling stage. In embodiments, and as described with respect to FIGS. 4, 5A, 5B, and 6, the snapshot module 430 measures an event polling stage time of an event polling stage by using a timer of the event machine 510.

At step 720, the system causes a thread of the application to take a snapshot of the application in response to determining the event polling stage. In embodiments, and as described with respect to FIGS. 4, 5A, 5B, and 6, the snapshot module 430 causes the main thread of the application to take the snapshot by sending an instruction to the event machine 510.

At step 725, the system measures a snapshot time for the snapshot of the application. In embodiments, and as described with respect to FIGS. 4, 5A, 5B, and 6, the snapshot module 430 measures the snapshot time using a timer of the event machine 510.

At step 730, the system determines whether the snapshot time is less than or equal to the event polling stage time. In embodiments, and as described with respect to FIGS. 4, 5A, 5B, and 6, the snapshot module 430 compares the snapshot time to the event polling stage time to determine whether the snapshot time is less than or equal to the event polling stage time.

At step 735, in response to determining the snapshot time is less than or equal to the event polling stage time, the system causes a thread of the application to take a new snapshot in response to determining a new event polling stage. In embodiments, and as described with respect to FIGS. 4, 5A, 5B, and 6, the snapshot module 430 sends an instruction to the event machine 510 to cause the main thread of the application to take a new snapshot in response to determining a new event polling stage. In embodiments, the new snapshot allows for a current recording of a state of the virtual machine of an application, thereby providing a more current recording of the application for duplication for debugging.

At step 740, in response to determining the snapshot time is greater than the event polling stage time, the system causes an alternate thread of the application to take the new snapshot in response to determining the new event polling stage. In embodiments, and as described with respect to FIGS. 4, 5A, 5B, and 6, the snapshot module 430 sends an instruction to the event machine 510 to cause the alternative thread of the application to take the new snapshot in response to determining the new event polling stage. In embodiments, the new snapshot provides a more current recording of the application for duplication for debugging.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
  accessing, by a computing device, an event machine of an application running on a user device;
  determining, by the computing device, an event polling stage of the event machine is occurring;
  measuring, by the computing device, an event polling stage time of the event polling stage;
  causing, by the computing device, a thread of the application to take a snapshot of the application in response to determining the event polling stage;

measuring, by the computing device, a snapshot time for the snapshot of the application;

determining, by the computing device, whether the snapshot time is less than or equal to the event polling stage time;

in response to the snapshot time being less than or equal to the event polling stage time, causing, by the computing device, the thread of the application to take a new snapshot in response to determining a new event polling stage; and in response to the snapshot time being greater than the event polling stage time, causing, by the computing device, an alternate thread of the application to take the new snapshot.

2. The method of claim 1, wherein the thread is a main thread of the application which is always running in the application.

3. The method of claim 1, wherein the event machine includes an event intercept stage.

4. The method of claim 3, wherein the event intercept stage intercepts an event from the user device.

5. The method of claim 3, further comprising determining that the event intercept stage occurs.

6. The method of claim 5, wherein the determining the event intercept stage occurs includes comparing code from the event machine to event intercept code.

7. The method of claim 5, wherein the measuring the event polling stage time of the event polling stage includes measuring a time between a start of the event polling stage and a start of the event intercept stage.

8. The method of claim 1, wherein the snapshot is a recording of a state of the application.

9. The method of claim 1, further comprising sending an instruction to the event machine to take the snapshot.

10. The method of claim 1, further comprising using a timer of the event machine to measure the snapshot time.

11. The method of claim 10, further comprising determining an average time for the event polling stage.

12. The method of claim 1, wherein the computing device includes software provided as a service in a cloud environment.

13. A computer program product comprising one or more computer readable storage media having program instructions collectively stored on the one or more computer readable storage media, the program instructions executable to:

access an event machine of an application running on a user device;

determine an event polling stage of the event machine is occurring;

measure an event polling stage time of the event polling stage using a timer of the event machine;

cause a thread of the application to take a snapshot of the application in response to determining the event polling stage;

measure a snapshot time for the snapshot of the application using the timer of the event machine;

determine whether the snapshot time is less than or equal to the event polling stage time;

in response to the snapshot time being less than or equal to the event polling stage time, cause the thread of the application to take a new snapshot in response to determining a new event polling stage; and in response to the snapshot time being greater than the event polling stage time, cause an alternate thread of the application to take the new snapshot.

14. The computer program product of claim 13, wherein the thread is a main thread of the application which is always running in the application.

15. The computer program product of claim 14, wherein the measuring the event polling stage time of the event polling stage includes measuring a time between a start of the event polling stage and a start of an event intercept stage.

16. The computer program product of claim 13, wherein the snapshot is a recording of a state of a virtual machine of the application.

17. A system comprising:

a processor, a computer readable memory, one or more computer readable storage media, and program instructions collectively stored on the one or more computer readable storage media, the program instructions executable to:

access an event machine of an application running on a user device;

determine an event polling stage of the event machine is occurring;

determine an event intercept stage of the event machine occurs;

measure an event polling stage time of the event polling stage between the event polling stage and the event intercept stage using a timer of the event machine;

cause a main thread of the application to take a snapshot of the application in response to determining the event polling stage;

measure a snapshot time for the snapshot of the application using the timer of the event machine;

determine whether the snapshot time is less than or equal to the event polling stage time;

in response to the snapshot time being less than or equal to the event polling stage time, cause the main thread of the application to take a new snapshot in response to determining a new event polling stage; and in response to the snapshot time being greater than the event polling stage time, cause an alternate thread of the application to take the new snapshot.

18. The system of claim 17, wherein the determining the event polling stage occurs includes comparing code from the event machine to event polling stage code.

19. The system of claim 17, wherein the determining the event intercept stage occurs includes comparing code from the event machine to event intercept stage code.

20. The system of claim 17, wherein the snapshot is a recording of a state of the application.

* * * * *